Aug. 9, 1932.  F. YEAGER  1,871,398
LOCK JOINT FOR SECTIONAL CONCRETE PIPES
Filed March 10, 1927
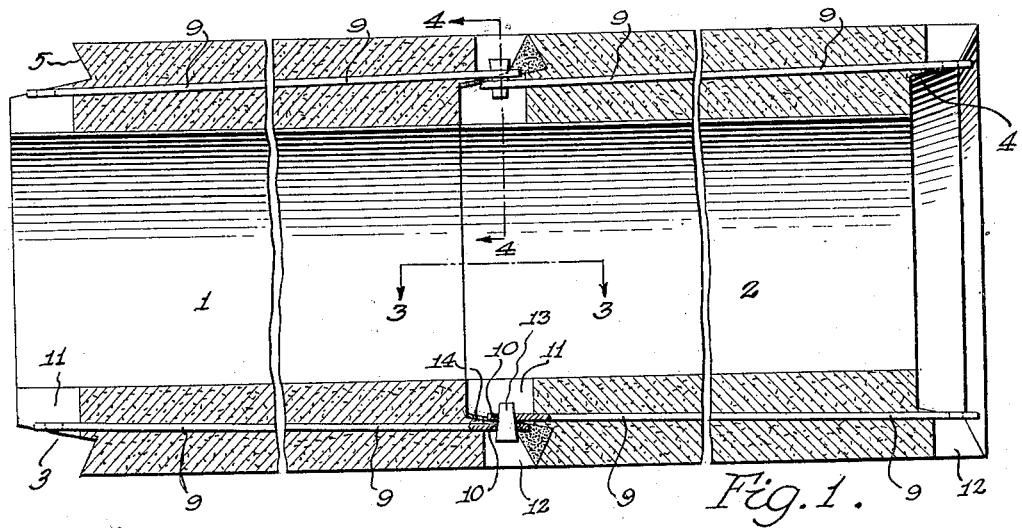
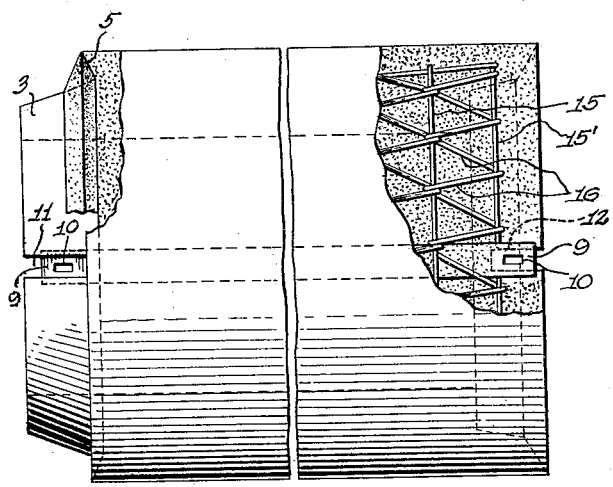
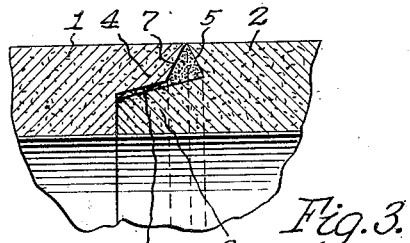
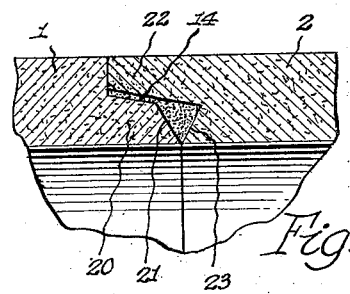
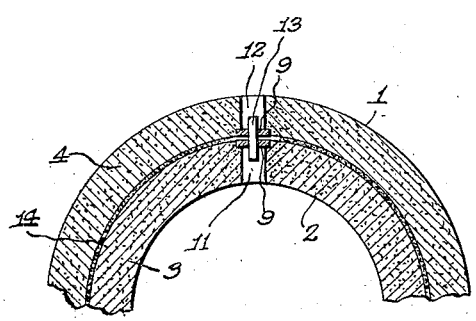
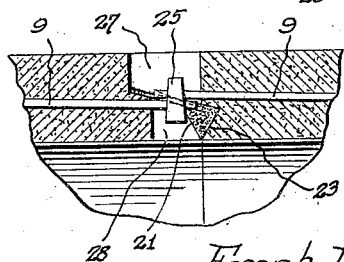
Inventor
Frank Yeager,
By
Attorneys Patented Aug. 9, 1932

1,871,398

UNITED STATES PATENT OFFICE

FRANK YEAGER, OF PORT HURON, MICHIGAN

LOCK JOINT FOR SECTIONAL CONCRETE PIPES

Application filed March 10, 1927. Serial No. 174,128.

The present invention pertains to a novel joint designed particularly for concrete pipe sections but also useful for pipe sections of other construction.

The principal object of the invention is the provision of a device of this character simple in construction and forming a sealed mortar chamber after the pipe sections have been drawn together. The ends of the sections are so formed that the mortar used for sealing purposes is confined in a closed chamber, without the use of auxiliary parts, so that it cannot be attacked from the outside or inside of the pipe and further cannot break off and drop out of place.

This novel joint is constructed for the further function of compressing the mortar as the sections are drawn together. Until the meeting ends come to their final position, the mortar under compression fills the cavity, and the excess is ejected. When the ends reach their final position, the mortar chamber is closed all around, effecting a compression of the mortar which is to remain therein.

The peculiar construction enabling these advantages may be applied to the pipe in at least two different ways, permitting the spreading of the mortar from either the outside of the pipe in case of small sizes, or from the inside of the pipe in case of large sizes, as desired.

The invention is fully disclosed in the following description and in the accompanying drawing, in which—

Figure 1 is a longitudinal section, partly in elevation, of a pair of pipe sections joined together according to the invention;

Fig. 2 is an elevation of one of the sections;

Fig. 3 is a detail section on the line 3—3 of Figure 1;

Fig. 4 is a section on the line 4—4 of Figure 1;

Fig. 5 is a detail section similar to Figure 3 and showing a slightly modified form of joint; and Fig. 6 is a detail section showing the same modification in a different plane.

Reference to these views will now be made by use of like characters which are employed to designate corresponding parts throughout.

In Figure 1 is shown a pair of sections 1 and 2 of similar construction, each comprising a spigot end 3 and a bell end 4. The sections are joined by inserting the spigot of one into the bell of the other, and the parts are locked and sealed by novel means constituting the subject matter of the invention.

In the embodiments shown in Figures 1 and 3, the spigot end is sloped as at 5 inwardly from the outer wall until reaching the spigot 3. The remaining end, or the bell 4 of the adjacent section which is formed to receive the spigot, is similarly sloped inwardly as at 7 from the same outer wall. These slopes are formed annularly around the wall of the pipe as clearly shown in Figure 2.

The bell 4 which receives the spigot 3 of the adjacent pipe section is of such depth that the slopes 5 and 7 engage one another in their plane of intersection which, in this case, obviously lies in the outer wall of the pipe. A substantially triangular cavity is thus formed, as clearly shown in Figure 1, and the function thereof will subsequently be described.

Into the wall of each section are inserted longitudinal metallic bars 9 having slots 10 in the ends thereof. The bars are of such length and the slots are so positioned that the bars of adjacent sections overlap and bring the slots thereof into coincidence. The ends of the bars are embedded in the pipe except at the slots which are accessible through openings 11 and 12 cut through the spigot and bell ends respectively of each section.

In assembling the pipe, sealing mortar is placed under the slope 5 and is shaped to form a wall diverging from the slope 5 as shown in Figure 2. Also, some mortar may be spread around the spigot 3 if desired. The sections are now brought together with the bars 9 thereof arranged as already described, and wedge-shaped keys 13 are driven through the coinciding slots to draw the pipe sections together. When the slopes 5 and 7 come into contact at the outer wall of the pipe, the cavity formed by these slopes is sealed, with the result that mortar cannot escape therefrom and further cannot be attacked from the out side. The outer end of the bell abuts the end of the adjacent section and thus seals the mortar chamber at this end as well. The outer diameter of the spigot 3 may be slightly smaller than the inner diameter of the bell so that excess mortar may be squeezed into the space 14 between these parts. The openings 11 and 12 may also be filled with mortar, if desired, to prevent leakage around the key 13 and further to prevent displacement of this member.

As also shown in Figure 2, the wall of the pipe is reinforced by a grating consisting of spaced rings 15 joined by obliquely disposed intersecting wires 16. The bars 9 are woven through the rings for firmer support when the sections are assembled as described, the end wires 15' of adjacent members are brought close together to provide further reinforcement at the joint.

Figure 5 illustrates a modification of the invention wherein the sloped surfaces are more easily accessible from the inside of the pipe. In this case the extremity of the spigot 20 is sloped as at 21 inwardly of the pipe from the inner wall thereof. The spigot is surrounded by the bell 22 of the adjacent pipe section and beneath this bell the wall of the same section is formed with a slope 23 extending inwardly of that section from the inner wall of the pipe. In this case also the parts are so arranged that when drawn together by the wedge-key locking device, the slopes 21 and 23 will meet at the inner wall, and the end of the bell 22 will abut the end of the adjacent pipe section.

This type of construction is used in pipes of large diameter wherein the application of the mortar may be made from the inside. In such cases it is also desirable to drive the wedge-key from the inside. No special provisions need be made for this arrangement of the key, the latter merely being inserted in the reverse position of that shown in Figure 1, as indicated by the numeral 25 in Figure 6. In this case also the openings 27 and 28 for accommodating the key and the overlapped ends of the bars may be filled with mortar if desired.

The relation of the sloped end walls to the spigot and bell is such that these walls may be made to converge at either the outer wall or inner wall of the pipe. Thus, the invention lends itself to use in connection with small pipes to which mortar must be applied from the outside, as well as pipes sufficiently large to accommodate a workman therein for applying the mortar from the inside. The mortar chamber is closed at one end by the converging slopes and at the other end by the surface abutment of the pipe ends. Thus, the mortar cannot be attacked from without or within, cannot break off and drop out of the joint; and no supplemental bands such as closure rings are required.

Although specific embodiments of the invention have been illustrated and described, it will be understood that various alterations in the details of construction may be made without departing from the scope of the invention as indicated by the appended claims.

What I claim is:—

1. A pipe joint comprised of two pipe sections, the meeting ends thereof being sloped divergingly from one of the surfaces of said sections but not as far as the other surface, said ends being adapted substantially for mutual contact in the plane of convergence of the slopes thereof, whereby a completely closed cavity may be formed between said slopes, and means carried by said sections for drawing said sections together and closing said cavity.

2. A pipe joint comprised of two pipe sections having overlapping ends, sloped faces formed on the end of one of the overlapping portions and on the adjacent part of the end of the other section, said slopes diverging from one of the surfaces of the pipe but not as far as the other surface, said ends being adapted substantially for mutual contact in the plane of convergence of the slopes thereof, whereby a completely closed cavity may be formed between said slopes, and means carried by said sections for drawing said sections together and closing said cavity.

3. A pipe joint comprised of two pipe sections, one end of one of the sections being sloped inwardly from one surface of said section but not as far as the other surface, the other pipe section being adapted to engage the first named section at the surface from which said slope extends, whereby a completely closed cavity may be formed between the meeting pipe ends, and means carried by said sections for drawing said sections together and closing said cavity.

4. A pipe joint comprised of two pipe sections, the meeting ends thereof being sloped divergingly from one of the surfaces of said sections but not as far as the other surface, said ends being adapted substantially for mutual contact in the plane of convergence of the slopes thereof, whereby a completely closed cavity may be formed between said closed cavity slopes, and wedge means adjacent the cavity for drawing said sections together.

5. A pipe joint comprised of two pipe sections, one end of one of the sections being sloped inwardly from one surface of said section but not as far as the other surface, the other pipe section being adapted to engage the first named section at the surface from which said slope extends, whereby a completely closed cavity may be formed between the meeting pipe ends, and wedge means adjacent the cavity for drawing said sections together.

6. A pipe joint comprised of two pipe sections, the meeting ends thereof being sloped divergingly from one of the surfaces of the sections but not as far as the other surface, said ends being adapted substantially for mutual contact in the plane of convergence of the slopes thereof, whereby a completely closed cavity may be formed between said slopes, said sections having registering openings at said ends, bars mounted longitudinally in said sections and overlapping in the space formed by said registering openings, said bars being slotted at said openings, and a wedge inserted in the slots of each pair of overlapping bars for drawing said sections together and closing said cavity.

In testimony whereof I affix my signature.

FRANK YEAGER.